(12) United States Patent
Banton

(10) Patent No.: US 6,985,627 B2
(45) Date of Patent: Jan. 10, 2006

(54) LED BAR ARRAY HIGH ADDRESSABLE IMAGING IN 2-DIMENSIONS

(75) Inventor: Martin E. Banton, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 863 days.

(21) Appl. No.: 09/731,120

(22) Filed: Dec. 6, 2000

(65) Prior Publication Data

US 2002/0067512 A1    Jun. 6, 2002

(51) Int. Cl.
G06K 9/62 (2006.01)

(52) U.S. Cl. .............. 382/209; 347/118; 347/253; 358/1.2; 358/1.9; 358/3.01; 358/3.09; 382/194; 382/247; 382/318; 396/108; 396/164

(58) Field of Classification Search ........... 347/248, 347/115, 119, 131, 118; 382/209, 217–218, 382/173, 252, 194; 399/47, 51, 84, 162; 358/3.01–3.02, 3.09, 1.1, 1.9, 3.21, 3.24, 358/406, 448

See application file for complete search history.

(56) References Cited

U.S. PATENT DOCUMENTS

| | | | |
|---|---|---|---|
| 4,970,554 A * | 11/1990 | Rouke ........................ 399/84 |
| 5,023,632 A * | 6/1991 | Yamamoto et al. ......... 347/119 |
| 5,027,158 A * | 6/1991 | Tompkins et al. .......... 399/162 |
| 5,053,818 A * | 10/1991 | Smith ........................ 399/47 |
| 5,274,472 A | 12/1993 | Williams |
| 5,327,524 A | 7/1994 | Ng |
| 5,367,381 A | 11/1994 | Curry |
| 5,430,472 A | 7/1995 | Curry |
| 5,455,681 A | 10/1995 | Ng |
| 5,606,648 A | 2/1997 | Walther et al. |
| 5,621,453 A | 4/1997 | Fujita et al. |
| 5,623,714 A * | 4/1997 | Thompson et al. ........... 399/51 |
| 5,659,399 A * | 8/1997 | Lin et al. .................. 358/3.02 |
| 5,748,330 A * | 5/1998 | Wang et al. ............... 358/3.21 |
| 5,751,328 A | 5/1998 | Tanuma et al. |
| 5,767,982 A | 6/1998 | Takahashi et al. |
| 5,774,165 A | 6/1998 | Nakajima et al. |
| 5,900,901 A * | 5/1999 | Costanza et al. ........... 347/248 |
| 5,920,683 A | 7/1999 | Girmay |
| 6,038,342 A * | 3/2000 | Bernzott et al. ............ 382/173 |
| 6,452,696 B1 * | 9/2002 | Bogart et al. ................ 358/1.9 |
| 6,538,677 B1 * | 3/2003 | Thompson ................. 347/131 |

* cited by examiner

Primary Examiner—Bhavesh M. Mehta
Assistant Examiner—Gregory Desire
(74) Attorney, Agent, or Firm—Fay, Sharpe, Fagan, Minnich & McKee, LLP

(57) ABSTRACT

An imaging apparatus includes an input that receives a stream of image pixels such as high addressable bits, multiple bits per pixel or binary image bits representing an input image and a processor that processes and directs signals to an LED bar that selectively exposes areas of a photoreceptor. The exposed areas of the photoreceptor form a latent image, controlled by the processor, of areas of varied exposure based on surrounding pixels. The processor examines the pixels to determine an image structure beneficially adaptable to varied exposure and selects a pixel for varied exposure, such as increased or decreased exposure or altered timing to apply the pixel.

4 Claims, 4 Drawing Sheets

LED BAR ARRAY HIGH ADDRESSABLE IMAGING IN 2-DIMENSIONS

BACKGROUND OF THE INVENTION

This invention relates to printers and other optical display systems having high gamma, photosensitive recording media and, more particularly, to relatively inexpensive and easily implemented methods and means for increasing the precision with which these display systems spatially position edges and other types of transitions in the images they display.

Many commercially available laser printers, as well as some electronic copiers, include imaging optics containing light emitting diode (LED) image bars or arrays. These devices place latent electrostatic images on previously charged xerographic photoreceptors. Typically, these photoreceptors have steeply sloped contrast vs. exposure characteristics (high gamma), together with well defined exposure thresholds (called the "xerographic threshold"), so they characteristically yield high contrast, bitmapped images (e.g., black and white). Some xerographic printers operate in a "write black" mode to optically expose the image foreground for printing by means of an "exposed area development" process, while others operate in a "write white" mode to expose the image background for printing by means of a "charged area development" process.

As is known, both write black and write white xerography are suitable for color printing. So-called "full color" xerographic prints customarily are composed by printing three or four different color separations (e.g., cyan, magenta and yellow for three color printing, and cyan, magenta, yellow and black for four color printing) in superimposed registration on a suitable substrate, such as plain paper. Highlight color prints, on the other hand, can be produced by printing as few as two color separations (e.g., black and a selected highlight color). There is, however, a common thread because each of these color separations generally is a high contrast image. It, therefore, will be evident that the fundamental operating principles and functional advantages of this invention apply to both monotone and color xerography.

Typically these LED bars are disposed within a xerographic device and selectively illuminate areas of a photoreceptor along the length of the bar otherwise known as the "fast scan direction." Simultaneously, the photoreceptor is advanced in an orthogonal or "process direction." In practice, beams of light are typically brought to focus on or near the photoreceptor surface to provide a substantially focused "scan spot."

LED bars ordinarily are designed to provide generally circular or elliptical scan spots. To a first approximation, such a scan spot is characterized by having a gaussian intensity profile (as is known, this may be a very rough approximation if the scan spot is truncated). Prior laser printers generally have employed scan patterns that are selected to have a scan pitch (i.e., the center-to-center displacement in the process direction, between spatially adjacent scan lines) that is comparable to the diameter of the scan spot as determined at an intensity level that is equal to one-half of its maximum or peak intensity. This sometimes is referred to as the full width, half max ("FWHM") diameter of the scan spot.

Images often contain many transitions. For instance, black and white and other dual tone images have transitions at the boundaries between their foreground features and their backgrounds, such as the transitions that demark line edges, font contours, and halftone dot patterns. Color images commonly include still additional transitions at the boundaries between differently colored foreground features. Consequently, the perceived quality of monotone and color prints tends to be strongly dependent upon the precision with which the printing process spatially positions these transitions.

Laser xerographic printers typically are designed to print at spatial resolutions ranging from about 300 dots/inch ("d.p.i") to about 600 d.p.i. As a practical matter, the image transition positioning precision of these printers can be increased to an extent by increasing their spatial resolution, but the frequency responses of the photoreceptor/developer combinations that currently are available for xerographic printing usually impose an upper limit on the resolution that can be achieved. Moreover, even when increased resolution is technically feasible, the additional resolution imposes further and potentially burdensome requirements on the optical and electrical design requirements of these printers, so there usually is a cost/performance tradeoff to be considered. Specifically, the cost of xerographic print engines tends to escalate as their spatial resolution is increased because of the additional memory and bandwidth these printers require for faithfully rendering higher resolution bitmap images without sacrificing throughput.

In apparent recognition of these technical challenges, others have proposed template matching techniques for more precisely controlling the size, positioning and number of picture elements ("pixels") that are printed on xerographic photoreceptors to render bitmapped images. For example, template matching has been developed for reducing the severity of certain printing artifacts, such as the observable stair step-like scan structure (commonly referred to as "jaggies") that sometimes degrades the xerographically printed appearance of non-vertical and non-horizontal lines. Template matching effectively overcomes some of the sampling errors that are caused by the use of input data that is too coarse to accurately represent the higher spatial frequency content of the image. It does not, however, solve the control problems that are encountered in existing printers because of the significant non-linearity of the way in which the spatial positioning and profiles of the transitions are handled.

It, therefore, will be evident that there still is a need for simplified methods and means for enabling optical printers and other display systems that render bitmapped images on high gamma, photosensitive recording media, such as xerographic laser printers, to faithfully reproduce spatial transitions within the images they render.

SUMMARY OF THE INVENTION

In accordance with one embodiment of the present invention, a method of digital imaging is provided where an LED bar selectively exposes an area of a photoreceptor in response to an input. The method includes receiving a plurality of pixels configured as high addressable, multiple bit per pixel or binary bits. An exposure on the photoreceptor of a selected pixel is varied based on surrounding pixels. The selected pixel exposes an area on the photoreceptor different than other pixels such as overexposing or altering the exposure timing of a pixel adjacent to an image characteristic.

In accordance with another aspect of the present invention, the method further includes parsing the plurality of image pixels for a determined image characteristic such as a line, edge or intersection.

In accordance with another aspect of the present invention, the parsing includes template matching the plurality of image pixels.

In accordance with another aspect of the present invention, where a set of the image pixels are exposed at a reference level, the varying step includes determining a particular image pixel to be exposed below the reference level. A pixel adjacent to the particular image pixel is selected for varied exposure and the selected pixel is overexposed relative to the reference level.

In accordance with another aspect of the present invention, the varying step includes delaying exposing of the photoreceptor for the selected pixel.

In accordance with another aspect of the present invention, the varying step includes altering the exposure of the photoreceptor for pixels selected from identifiable image structures.

In accordance with another embodiment of the present invention, an imaging apparatus includes an input which receives pixels representing an input image and a buffer which stores the received pixels. The apparatus also includes a processor which processes and directs signals to an LED bar which selectively exposes areas of a photoreceptor to produce a latent image. The processor controls photoreceptor exposure by varying the exposure of a selected pixel based on surrounding pixels.

In accordance with another aspect of the present invention, the processor includes an image structure parser which examines the pixel to determine an image structure beneficially adaptable to varied exposure. An pixel selector is also provided which analyzes pixels of the determined image structure and selects a pixel for varied exposure. Also, an exposure calculator determines an exposure relative to a reference for at least the selected pixel.

In accordance with another aspect of the present invention, the determined image structure includes an edge offset in a process direction of the photoreceptor, and the exposure calculator determines an overexposure relative to the reference.

In accordance with another aspect of the present invention, the determined image structure includes intersecting edges, and the exposure calculator determines an exposure timing altered from the reference.

In accordance with another embodiment of the present invention, a method of printing a digital image is disclosed where a plurality of light emitters selectively apply a determined exposure to areas on a charge retentive surface. The method includes receiving a stream of image pixels representative of the digital image, and analyzing the image pixels for an image characteristic such as an edge or transition. Based on the analyzing, a first area is exposed on the charge retentive surface corresponding to the image characteristic by more than the determined exposure amount.

In accordance with another aspect of the present invention, the method further includes exposing an area adjacent to the first area on the charge retentive surface less than the determined exposure amount.

In accordance with another aspect of the present invention, based on the analyzing, the method further includes altering the timing of exposing the charge retentive surface.

In accordance with another aspect of the present invention, the analyzing includes comparing a set of image pixels with a pattern determined to identify image characteristics.

In accordance with another embodiment of the present invention, a method of digital imaging is provided where the digital image is processed and output on a printing device including an image bar disposed across a charge retentive surface. The method includes scanning an input data sequence representative of the digital image until a determined condition is encountered, and assigning an altered exposure value to a datum in the input sequence based on adjacency to the determined condition.

In accordance with another aspect of the present invention the method further includes converting the assigned altered exposure value to an associated electrostatic exposure on the charge retentive surface.

In accordance with another aspect of the present invention, where the determined condition includes a boundary, the assigning step includes assigning a value representative of increased electrostatic exposure of a discrete area on the charge retentive surface at the boundary.

In accordance with another aspect of the present invention, where the determined condition includes a corner, the assigning step includes assigning a value representative of altered timing of the electrostatic exposure of a discrete area on the charge retentive surface at the boundary.

In accordance with another aspect of the present invention, the converting includes illuminating a portion of the charge retentive surface with: a first spot size for data assigned with the altered exposure value, and a second spot size smaller than the first spot size for data assigned with other than the altered exposure value.

One advantage of the present invention resides in the identification, in real time, of image characteristics which are enhanced from selective altered exposure.

Another advantage of the present invention resides in the application of high addressability techniques to LED bars with their often inherently smaller spot sizes.

Another advantage of the present invention resides in the smoothing of edges, corners and/or intersections of output images.

Yet another advantage of the present invention resides in the ability to employ the sharp spot profiles available from an LED bar, for example, while enabling two-dimensional high addressable printing.

Still further advantages of the present invention will become apparent to those of ordinary skill in the art upon reading and understanding the following detailed description of the preferred embodiments.

BRIEF DESCRIPTION OF THE DRAWINGS

The invention may take physical form in parts and arrangements of parts, and in certain steps and arrangements of steps. The drawings are only for purposes of illustrating the preferred embodiments and are not to be construed as limiting the invention.

DETAILED DESCRIPTION OF THE PREFERRED EMBODIMENT

Figure 1:
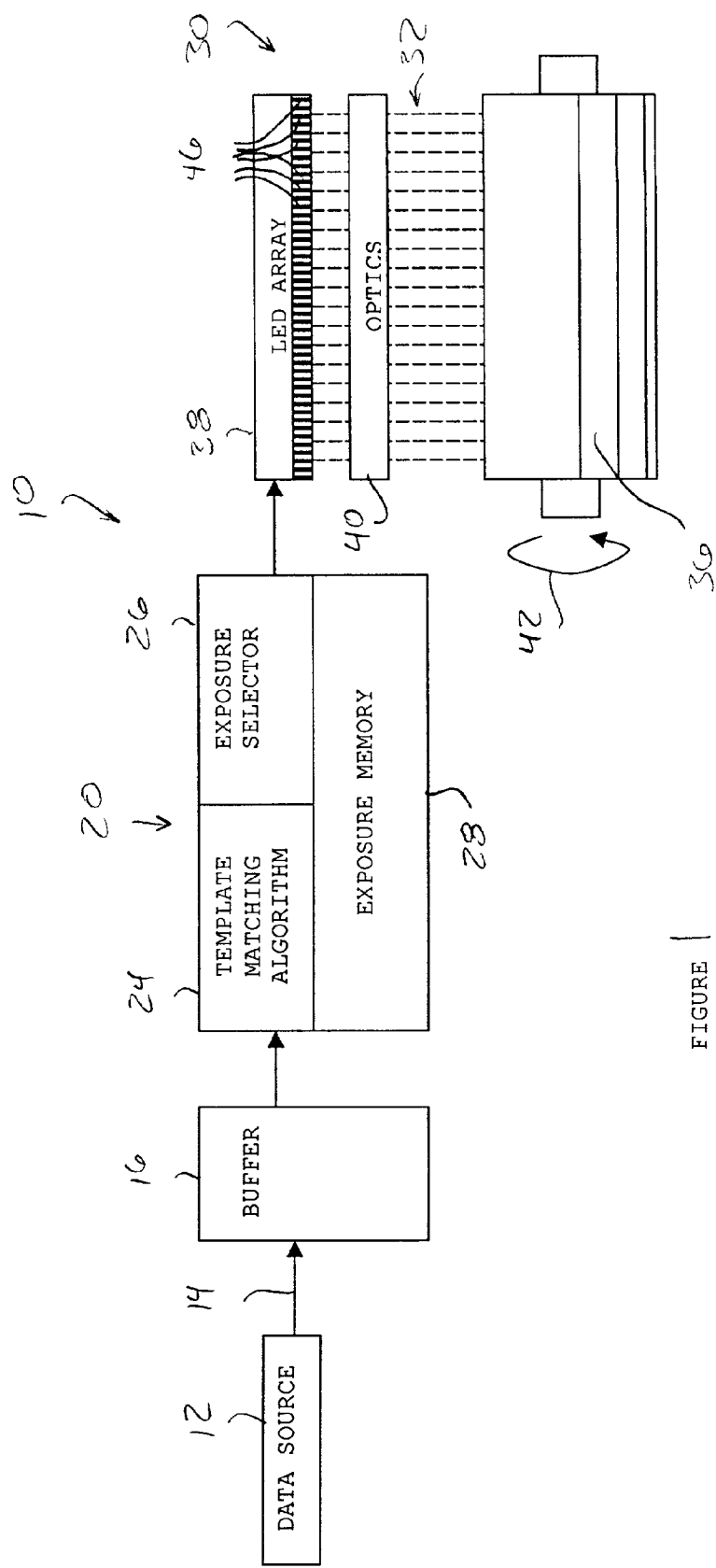
FIG. 1 is a simplified schematic diagram of a xerographic printer that is equipped to carry out the present invention.

Turning now to the drawings, and at this point especially to FIG. 1, there is a xerographic print engine 10 (shown only in relevant part) having a data source 12 supplying pixels 14 representative of an image. The pixels 14 are optionally held in a buffer 16 before processing by an image rendering processor 20. In addition to conventional image rendering algorithms, the processor 20 includes an image characteristic identifier 24 which parses incoming pixels for particular image features such as lines, edges, text, corners and the like and identifies those pixels for special rendering as described below. A suitable image characteristic identifier 24 is the template matching algorithm illustrated, adaptable by those skilled in the art after the teachings herein are fully disclosed. Once identified, selector 26 selects particular pixels for variable exposure processing (more fully discussed below) and the varied exposure is determined, for example from memory 28.

Other rendering is applied and a data stream corresponding to desired light pulses is supplied to imaging optics 30. Here, the optics 30 are configured to scan a data modulated light beam 32 over a xerographic photoreceptor 36. To that end, an LED array 38 selectively generates a light beam 32 in the visible or invisible (e.g., infra-red) band of the spectrum. Projection optics or light focusing means 40 focus light 32 onto selected areas of the photoreceptor 36.

In the illustrated embodiment, the LED array 38 is disposed across the photoreceptor 36 in the fast scan direction. The photoreceptor 36, is advanced (by means not shown) simultaneously in an orthogonal, process direction at a substantially constant linear velocity, as indicated by the arrow 42, so the array of beams 32 exposes the photoreceptor 36 in successive raster-like scan lines. As shown, the photoreceptor 36 is coated on a rotating drum, but it will be apparent that it also could be carried by a belt or any other suitable substrate.

More particularly, the image bar 38 is composed of a linear array of individually addressable LED's 46 that are distributed widthwise of the photoreceptor 36 on generally uniformly spaced centers for sequentially exposing the photoreceptor 36 to successive lines of an image as the photoreceptor 36 is being advanced (by means not shown) in an orthogonal process direction. In this embodiment, the image bar 38 is projected onto the photoreceptor 36 by suitable projection optics 40, such as an array commercially available from Nippon Sheet Glass. It is to be appreciated that the optics 40 can be integrally mounted with the LED array 38 or separate as shown, to image the array of LED emitters at one-to-one on photoreceptor 36.

As will be appreciated, each of the line-like exposure profiles that the image bar 38 prints on the photoreceptor 36 is composed of multiple, superpositioned, discrete exposures that have contrast levels which vary in accordance with the output intensities of the respective LED's by which they were printed. Thus, different than other imaging optics, LED bars typically comprise projection optics 40 which cause the center-to-center spacing of these superpositioned exposures to be substantially greater than the effective diameter of the individual print spots that are produced by the LEDs.

The optical aperture of the LED array 38 is sufficiently large to avoid excessive truncation of the light beam 32 because the beam 32 then comes to a generally circular or elliptical focus with a gaussian intensity profile. However, the broader aspects of this invention are not limited to any specific scan spot geometry or intensity profile. Accepted design principles indicate that the spatial frequency power spectrum of the scan spot profile should not have significant spatial frequency components outside the spatial frequency passband of the imaging system, but the scan spot can otherwise be tailored to satisfy a variety of system requirements.

To carry out the present invention, the processor 20, hence the light beam 32 variably exposes the photoreceptor 36. In other words, amplitude, duty cycle, pulse width, number and location of high addressable bits and/or timing of illumination, as well as combinations of the preceding are modulated (collectively referred to herein as "variably exposed" or a variant thereof) in accordance with successive multi-bit digital data values and particularly in response to surrounding pixels and identified image characteristics. These data values are optionally clocked out of rendering processor 20 serially or in parallel in response to data clock pulses which are time synchronized. As will be appreciated, rendering processor 20 or other means (not shown), may preprocess the data for the printing of halftoned pixels, contone pixels, negative signals, text, line art and/or other corrections.

As is known, the fast scan pixel positioning precision of the print engine 10 can be enhanced, if desired, by means of systems such as those described in the following commonly assigned United States Patents (hereby incorporated by reference): D. N. Curry U.S. Pat. No. 4,622,593 which issued Nov. 11, 1986 on "Polygon Signature Correction"; D. N. Curry U.S. Pat. No. 4,639,789 which issued Jan. 27, 1987 on "Raster Scanner Variable-Frequency Clock Circuit"; D. N. Curry et al. U.S. Pat. No. 4,766,560 which issued Aug. 23, 1988 on "Parallel/Pipelined Arithmetic Variable Clock Frequency Synthesizer"; D. N. Curry U.S. Pat. No. 4,860, 237 which issued Aug. 22, 1989 on "Scan Linearity Correction"; D. N. Curry U.S. Pat. No. 4,893,136 which issued Jan. 9, 1990 on "Arithmetically Computed Motor Hunt Compensation for Flying Spot Scanners"; and D. N. Curry U.S. Pat. No. 4,935,891 which issued Jun. 19, 1990 on "Pseudo-Random Phase Shifted Arithmetic Bit Clock Generators for Digital Printers."

It is to be understood, however, that the increased pixel positioning precision that these existing compensation techniques provide strictly pertains to the spatial positioning of the pixel centers in the fast scan direction. This differs from the two dimensional "high addressability" or "microaddressability" that this invention provides because microaddressability enables image transitions to be spatially positioned with sub-resolution precision in both the process direction and the fast scan direction. This feature sometimes is referred to as "two dimensional high, addressability" or, in abbreviated form, as "2D high addressability." See e.g.: D. N. Curry, U.S. Pat. No. 5,367,381 which issued Nov. 22, 1994 on "Method and Apparatus for Enhanced Resolution and Contrast via Super Intensity Controlled Overscanned Illumination in a Two Dimensional High Addressability Printer" hereby incorporated by reference.

Figure 2A:
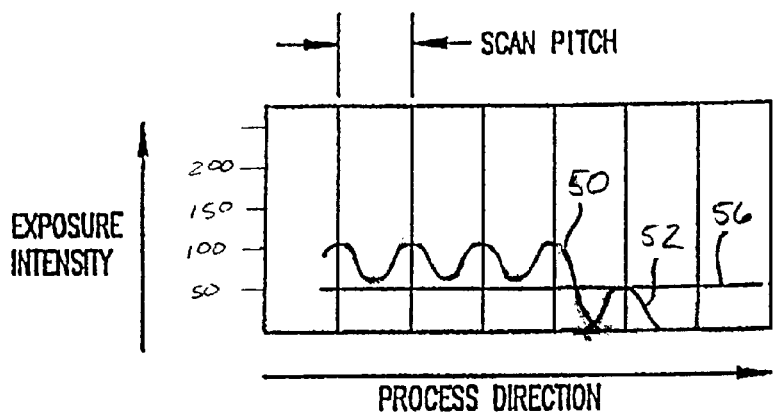
FIG. 2A illustrates a prior art partial intensity boundary scan effect in the process direction of a prior art LED bar printer with a scan pattern having a scan pitch approximately equal to the FWHM diameter of the scan spot.
Figure 2B:
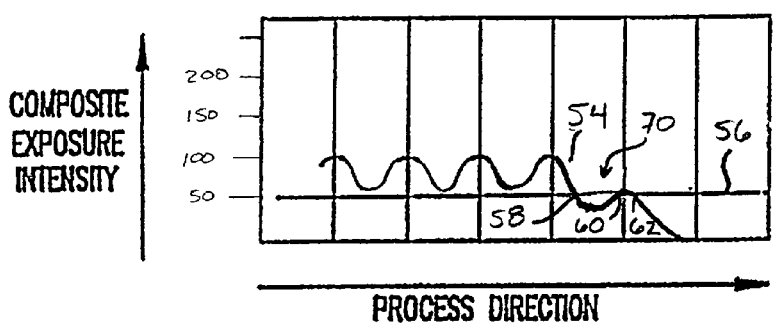
FIG. 2B illustrates the prior art composite exposure profile when the printer is operated in accordance with FIG. 2A.
Figure 2C:
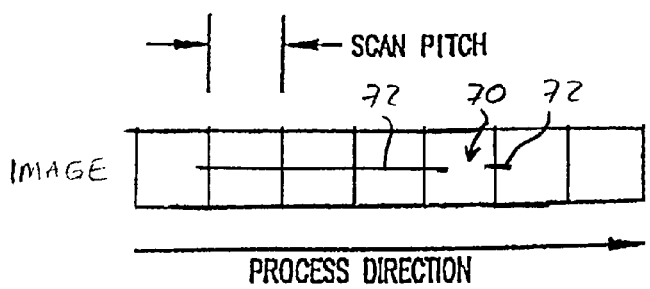
FIG. 2C illustrates the prior art output image produced by the composite exposure profile of FIG. 2B.

More particularly, FIGS. 2A–2C illustrate a typical edge shifted exposure on a prior art xerographic photoreceptor for a step function oriented in the process direction. That is, when the printing is performed by scanning a generally circular scan spot having a gaussian intensity profile over the photoreceptor in accordance with a scan pattern having a pitch greater than the FWHM diameter of the sharp scan spot generated by LED bars. The step function is a typical image transition, which is defined by (a) a series of full intensity scans (the exposure caused by them is shown in FIG. 2A at 50), followed by (b) a single intensity modulated transitional or "boundary" scan as at 52 in FIG. 2A, and then by (c) a series of full-off or zero intensity scans.

FIG. 2B demonstrates that the superpositioning of the discrete exposures that result from such a sequence of scans causes the exposures to additively combine, thereby producing a composite exposure profile 54 that crosses the xerographic threshold 56 of the photoreceptor 36 at points 58, 60, and 62 which are spatially varied in the process direction of the photoreceptor (for illustrative purposes, the xerographic threshold 56 is depicted as being at about one half the peak level of the composite exposure profile 54). However, the small spot size of the led array coupled with conventional "raster" spacing or pitch results in artifact 70.

As best observed by FIG. 2C, the resulting image includes the artifact 70 evident as a gap or discontinuity in the illustrated output image 72, not the desired spatially offset boundary or image condition.

Figure 3A:
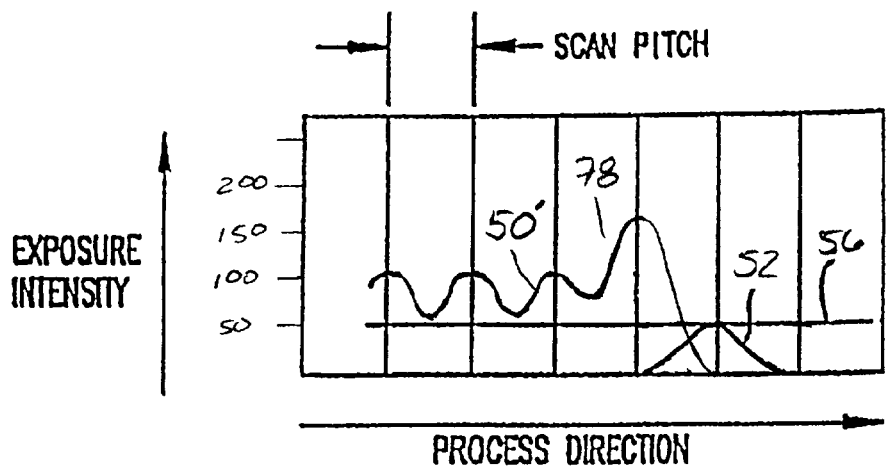
FIG. 3A illustrates a partial intensity boundary scan in accord with the present invention of a printer of the type shown in FIG. 1 with a scan pattern having a scan pitch approximately equal to the FWHM diameter of the scan spot.

With reference now to FIG. 3A, an edge shifted exposure according to the present invention is illustrated also as a step function oriented in the process direction. Here, the scan spot is similarly placed on the photoreceptor by scanning a generally circular scan spot having a gaussian intensity profile over the photoreceptor in accordance with a scan pattern having a pitch greater than the FWHM diameter of the scan spot. The step function however, is identified as containing a boundary, edge or typical image transition (in image characteristic identifier 24 FIG. 1). The transition is rendered as (a) a series of full intensity scans (the exposure caused by them is shown in FIG. 3A at 50'), followed by (b) a variably exposed single super-intensity or overexposed "pre-boundary" scan as at 78 in FIG. 3A, followed by (c) the single intensity modulated transitional or "boundary" scan as at 52 in FIG. 3A, and then by (d) a series of full-off or zero intensity scans.

Figure 3B:
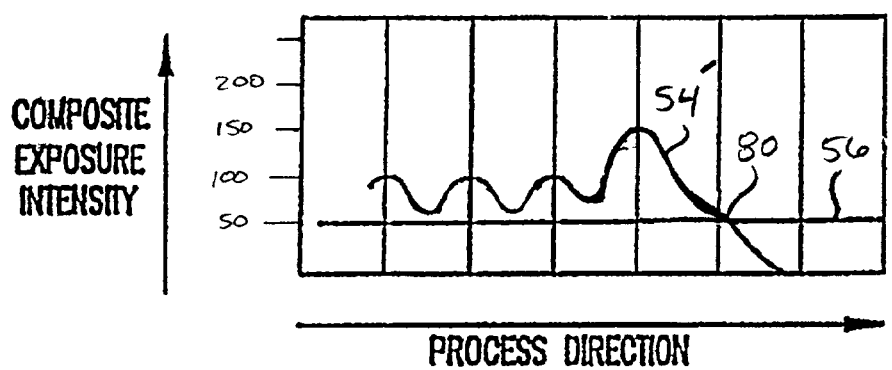
FIG. 3B illustrates a composite exposure profile when the printer is operated in accordance with the present invention.

FIG. 3B demonstrates that the superpositioning of the discrete exposures, including the variably exposed super-intensity scan 78 causes the exposures to additively combine, thereby producing a desirable composite exposure profile 54' that crosses the xerographic threshold 56 of the photoreceptor 36 at point 80 which is spatially varied in the process direction of the photoreceptor.

Figure 3C:
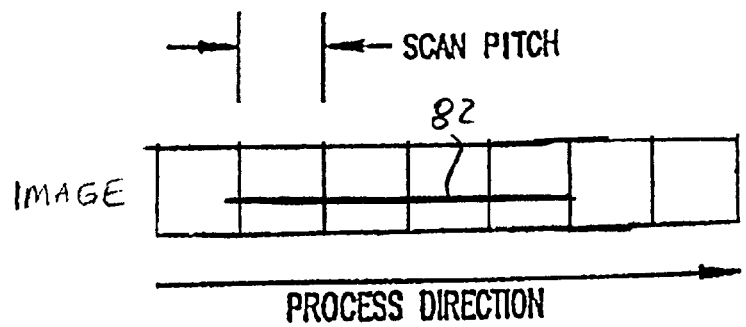
FIG. 3C illustrates the output image produced by the composite exposure profile of FIG. 3B.

FIG. 3C accordingly illustrates the resulting output image 82 showing an idealized image characteristic.

Figure 4:
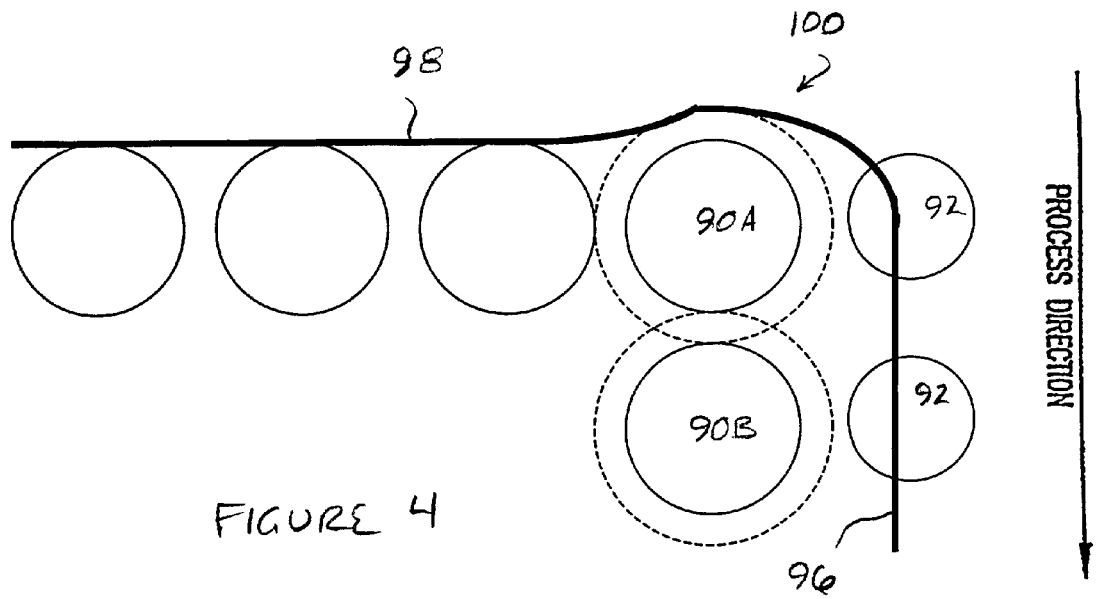
FIG. 4 illustrates an image artifact for a special condition of the present invention.

Referring generally now to FIG. 4, an exemplary corner rendering is illustrative of a deficiency in the use of increased exposure pixels to shift intersections such as edges or corners. In certain cases it is desirable to use high addressibility on only one of the edges of a corner and in other cases it is desirable to use different amounts of high addressibility on both of the intersecting edges. As illustrated, variably exposed, here overexposed, "pre-boundary" 90A, 90B pixels border "boundary" scan pixels 92 to define a vertical edge 96 offset in the fast-scan direction. However, vertical edge 96 intersects horizontal edge 98 placing overexposed "pre-boundary" 90A in the corner defined by the intersection. It can now be observed that when all of the variably exposed or "pre-boundary" pixels 90 are rendered similarly, an undesirable bump or image artifact 100 appears near the intersection.

Figure 5:
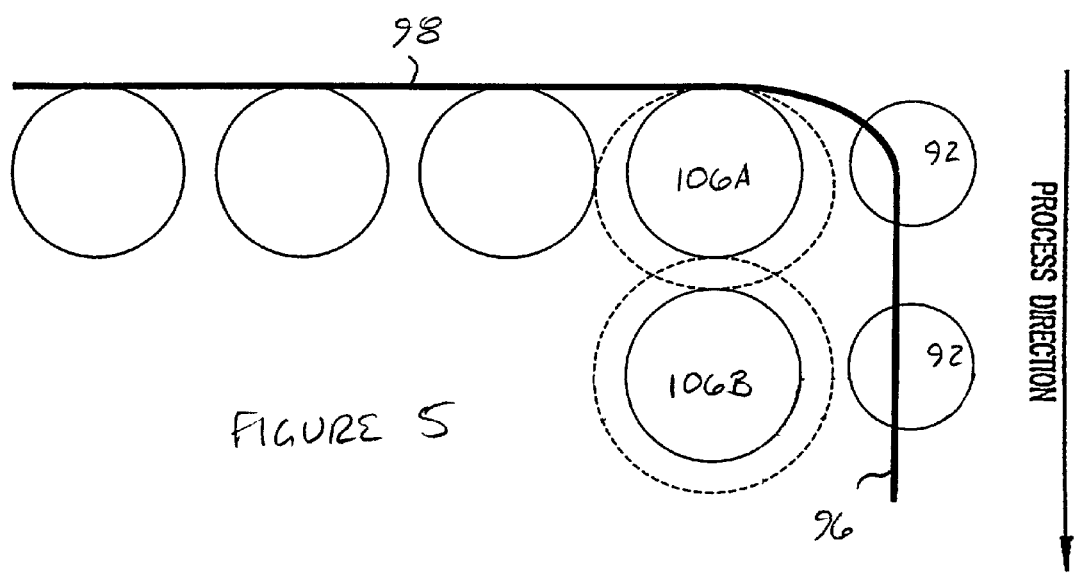
FIG. 5 illustrates an intersection printed according to another aspect of the present invention.

FIG. 5 illustrates an exemplary solution to the above described deficiency. As above, the overexposed "pre-boundary" pixels 106A, 106B border the "boundary" scan pixels 92 to define the vertical edge 96 offset in the fast-scan direction. However, when the corner or intersection is encountered during image rendering (as discussed above, image characteristic identifier 24 FIG. 1), pixel 106A is determined to occupy the corner and special variable exposure processing is applied. In this case, pixel 106A is imaged temporally offset or delayed, and is thus spatially displaced with respect to the photodetector 36 and other pixels in the scan-line.

Those skilled in the art will now appreciate that the discussion above is equally applicable depending on the orientation of the image characteristic desired to be printed. In other words, edges can be extended in the process direction with equal ease by applying the principles discussed above. Moreover, the special corner or intersection condition can be rendered effectively by altering the timing in the process direction to either "variably expose late" as illustrated in FIG. 5, or to "variably expose early" by ceasing exposing the photoreceptor before other pixels in the raster line (not shown).

If desired, the data values for the boundary scans may be precompensated (by means not shown) to compensate for any residual nonlinearity of the addressability response (i.e., the boundary scan intensity/exposure boundary position relationship) of the printer 10 and at the selected scan pitch. This precompensation provides the data values that are needed to cause the actual spatial positioning of the transitions to even more closely track the desired positioning.

As will be understood from the foregoing teachings, variable exposure can be employed to provide substantially linear, sub-resolution control over the spatial positioning of image transitions in electrostatically produced exposure profiles.

The invention has been described with reference to the preferred embodiments. Modifications and alterations will naturally occur to others upon reading and understanding the preceding detailed description, such as employing the teachings on photoreceptors having various contrast vs. exposure characteristics, exposing selected pixels early or late, overexposed or underexposed or combinations thereof, and the like. It is intended that the invention be construed as including all such modifications and alterations insofar as they come within the scope of the appended claims, or the equivalents thereof.

Having thus set forth the preferred embodiments, the invention is now claimed to be:

1. A method of xerographic digital imaging where an LED bar selectively exposes an area of a photoreceptor in response to an input, the method comprising:
   receiving a plurality of pixels represented by input pixel values;
   identifying within the received pixels a pattern, the pattern including a transition between two different input pixel values; and
   rendering the transition with a series of consecutive exposures of the photoreceptor by the LED bar, said exposures including: a first exposure at a first intensity level, a second exposure at a second intensity level greater than the first intensity level, a third exposure at a third intensity level less than the first intensity level, and fourth exposure at a fourth intensity level less than the third intensity level.

2. A method of digital imaging where a digital image is processed and output on a printing device including an image bar disposed across a charge retentive surface, the method comprising:

parsing an input data sequence representative of the digital image until a determined condition is encountered, the determined condition including a boundary offset in a process direction; and assigning a varied exposure value to a datum in the input sequence based on adjacency to the determined condition, said assigning including:

assigning a value representative of increased electrostatic exposure relative to a reference value to a first datum in the input sequence at a position in the boundary; and assigning a value representative of decreased electrostatic exposure relative to a reference value to a datum in the input sequence adjacent to the first datum.

3. The method of printing a digital image as set forth in claim 2, where the converting comprises:

illuminating a portion of the charge retentive surface with:

a first spot size for data assigned with the reference value, and a second spot size smaller than the first spot size for data assigned with the varied exposure value.

4. The method of imaging as set forth in claim 2, where the parsing comprises template matching the input data sequence representative of the digital image.

* * * * *